(No Model.) 2 Sheets—Sheet 2.
W. H. SAWYER.
ELECTRIC CABLE.
No. 297,855. Patented Apr. 29, 1884.
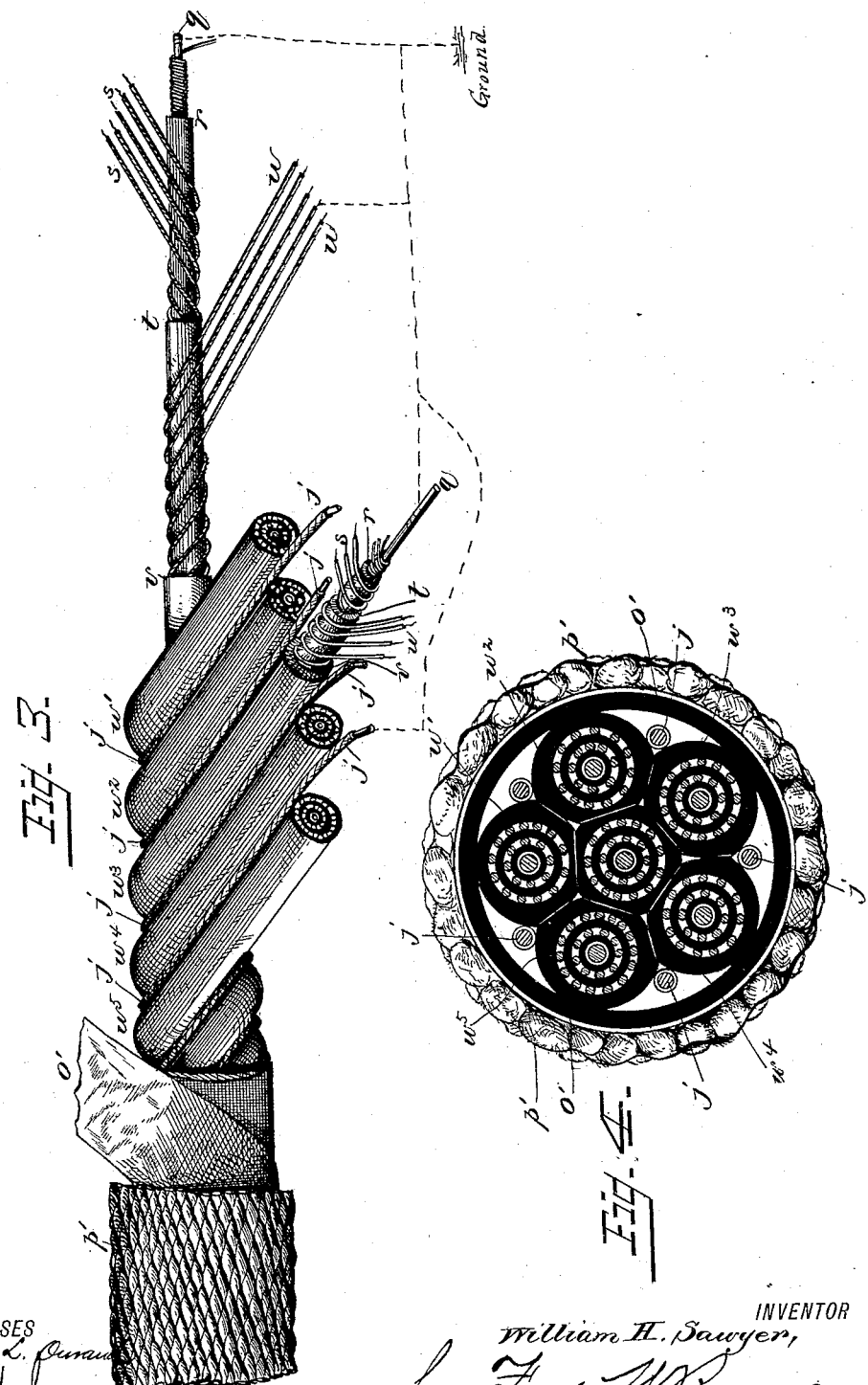
WITNESSES
INVENTOR
William H. Sawyer,
by Fred. W. Royce,
Attorney

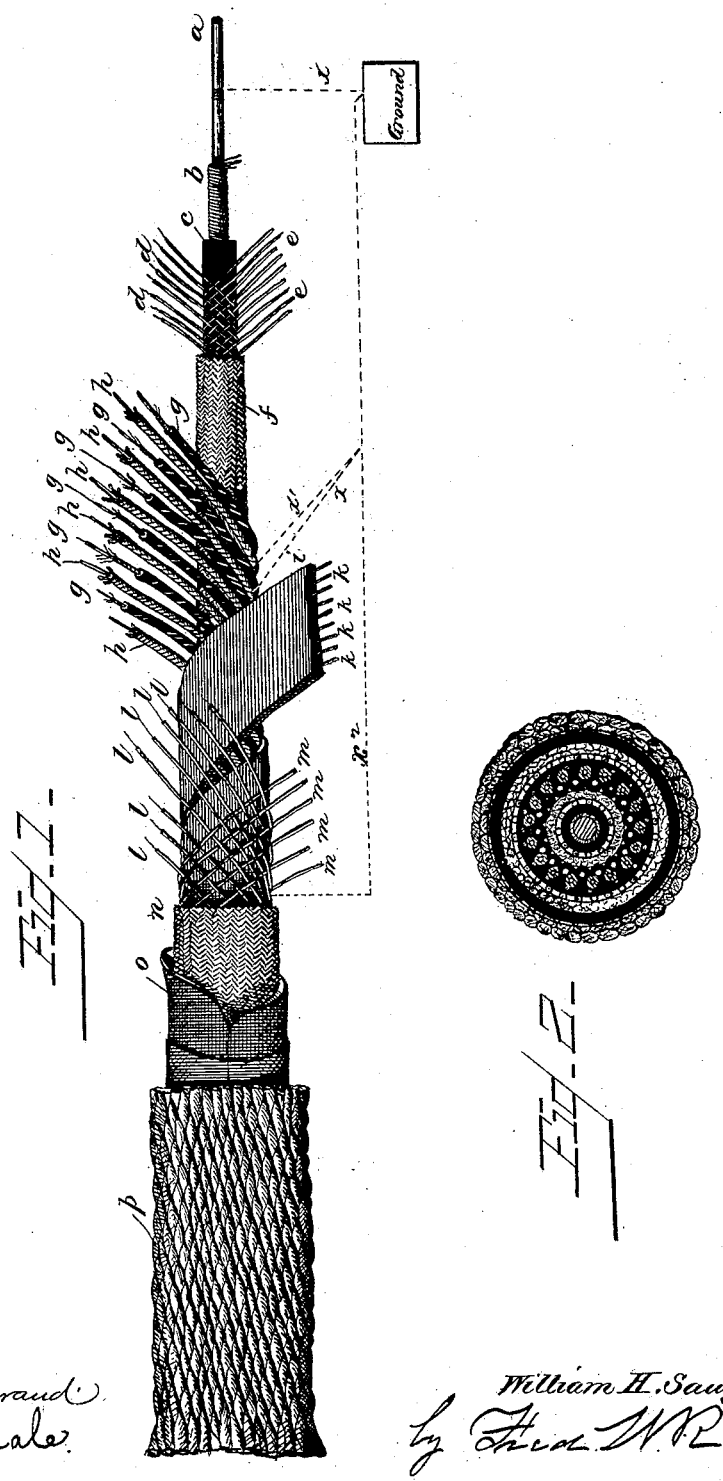

UNITED STATES PATENT OFFICE.

WILLIAM H. SAWYER, OF PROVIDENCE, RHODE ISLAND.

ELECTRIC CABLE.

SPECIFICATION forming part of Letters Patent No. 297,855, dated April 29, 1884.

Application filed December 29, 1883. (No model.)

*To all whom it may concern:*

Be it known that I, WILLIAM H. SAWYER, a citizen of the United States, residing at Providence, in the county of Providence and State of Rhode Island, have invented certain new and useful Improvements in Electric Cables; and I do hereby declare the following to be a full, clear, and exact description of the invention, such as will enable others skilled in the art to which it appertains to make and use the same.

My invention relates to an improvement in electrical cables comprising fine wires as conductors, its object being to provide a cable in which wires of small gage, for telephonic and similar purposes, will be protected from induction and guarded against breakage by excessive strain.

In cables of this class as heretofore constructed the fine wires are frequently ruptured, owing to the unequal tension to which they are subjected in the reeling, stretching, and other manipulations of the cable; and in order to overcome this disadvantage of fine-wire cables, my invention consists in a novel construction of a compound cable, which will be readily understood from the following particular description in connection with the accompanying drawings, in which—

Figure 1 is a view of a piece of cable constructed according to my invention, the several servings or layers of wires and insulating and protecting sheathings being partially cut away and brought out in order that their arrangement may be observed. Fig. 2 is an enlarged cross-section of the cable. Fig. 3 is a view of a cable of modified construction with its various parts exposed, and Fig. 4 is an enlarged cross-section of this modified cable.

In constructing my improved cable as shown in Fig. 1, I commence with one large central wire, $a$, wound with cotton, as shown at $b$, which is preferably saturated with some resinous compound, and outside of which I place a covering, $c$, of india-rubber, preferably vulcanized, the resinous compound in the cotton being to prevent action of the sulphur in the rubber upon the central wire. Around the rubber sheathing $c$, I braid, with wide meshes, a series of fine covered wires, $d$, and cotton or other fibrous threads, $e$, the wires running spirally in one direction and the threads in the other, and the braiding of the two together having the effect of holding the wires properly spaced. Outside of the braided wires and threads I then braid a close covering of cotton, $f$, or other fibrous threads, and saturate the same with a resinous compound, preferably a mixture of equal parts of beeswax and paraffine. Upon this last fibrous covering, $f$, I wind spirally and close together a number of rubber-covered wires, $g$—say number 20 gage—and then upon this serving of rubber-covered wires I wind spirally in the same direction a number of simply fibrous-covered wires, $h$, which respectively lie in the depressions between two contiguous rubber-covered wires, so that each fibrous-covered wire gets the benefit of the rubber insulation of a neighboring wire on each side. Then around this serving of rubber-covered and fibrous-covered wires I wind spirally in the opposite direction a rubber band, $i$, composed of two rubber strips laid flatwise together, with a series of longitudinal fine covered wires, $k$, between them. Then outside of this spiral rubber band I braid a series of fine covered wires, $l$, and fibrous threads $m$, the wires running in one direction spirally and the threads in the other, the braiding of the wires and threads together serving to hold the wires evenly spaced so as to give a neat and uniform surface to the cable at this point. Upon this serving of threads and wires I now braid a close protecting-sheathing, $n$, of fibrous threads, preferably saturated with resinous compounds, as before, and outside of this I place a longitudinal or spiral rubber covering, $o$, preferably vulcanized, with its adjacent edges overlapping and cemented together, and, finally, outside of this rubber covering I weave a thick and close protecting-covering, $p$, of cotton cords, and give the same a thorough coating of water-proof paint or compound, which, after it dries, in connection with the rubber tape, protects the interior of the cable from moisture, while allowing it to have a sufficient flexibility for all practical purposes.

In practice I prefer to connect the main central wire, $a$, with the ground at the ends or at intervals by branch wires, as shown at $x$, and I also ground several of the fibrous-covered wires $h$, as shown at $x'$, and also one or more of the fine wires $l$, as shown at $x^2$. The groundings may be separate, or the several wires to be grounded may be connected with each other and put to ground through a common ground-wire. This grounding has the effect of taking off induced currents, which would produce more or less confusion of signals on the other wires.

By an inspection of the drawings it will be seen that the main central wire, $a$, may be arranged to support the main tensile strain upon the cable, and that, while the spiral winding of the fine wires obviates their being subjected to any severe tensile strain, the braiding-threads prevent these fine wires from becoming disarranged and tangled together. The various interposed sheathings of rubber give a perfect insulation to the several conductors, and the braided fibrous sheathings so strengthen the whole that there is no likelihood that any stretching can occur tending to breaking or disarranging any of the conductors.

In the modified form of cable particularly illustrated in Fig. 3, I commence with a central heavy cotton-covered wire, $q$, and surround it with a rubber covering, $r$, upon which I wind spirally a series of fine silk or cotton covered wires, $s$. Outside of these spiral wires I place another rubber covering, $t$, about which I wind spirally in the opposite direction a series of fine silk or cotton covered wires, $u$, over which I place another covering, $v$, of rubber, and thus complete the central group of the cable. I then prepare five other similar groups, $w'$ $w^2$ $w^3$ $w^4$ $w^5$, and cable them spirally around this central group, and then wind in the depressions between each two spirally-wound groups a fibrous-covered wire, $j$, and cover the whole with a heavy spirally-wound rubber tape, $o'$, with overlapping cemented edges, and then weave outside of this rubber tape a thick cotton covering, $p'$, which I thoroughly coat with water-proof paint or compound, as in the first-described form of cable. This modified form of cable has the same advantages as the first form—namely, a stout central wire to take the tensile strain, the opposite spiral windings of wires to break up inductive effects and prevent excessive tensile strain, the utilization of the rubber coverings of contiguous rubber covered wires for insulating a series of inter-superposed wires, and the combined rubber and fibrous water-proof outside covering. One or more wires of this form of cable may also be grounded, as shown.

What I claim is—

1. A fine wire electric cable in which, upon a central heavy wire and insulated therefrom, are a series of fine covered wires and a series of fibrous threads braided together, the wires running spirally in one direction and the threads in the opposite direction, substantially as described, and for the purpose set forth.

2. An electrical cable in which, with a series of spirally-wound rubber-covered wires, is wound a series of fibrous-covered wires lying in the depressions between the rubber-covered wires, substantially as and for the purpose set forth.

3. The cable composed of the central cotton-covered wire, $a$, rubber covering $c$, braided fine wires and threads $d$ and $e$, fibrous covering $f$, alternate spirally-wound rubber cover and fibrous-covered wires $g$ and $h$, fine wires $k$, inclosed between spiral rubber strips, braided wires $l$, and threads $m$ and a water-proof covering, substantially as described.

4. An electric cable in which a central body has wound about it in running spirals a series of wires inclosed between two strips of rubber, substantially as described.

In testimony whereof I affix hereto my signature in presence of two witnesses.

WILLIAM H. SAWYER.

Witnesses:
GILMAN E. JOPP,
W. A. HATHAWAY.